(12) United States Patent
Jordberg

(10) Patent No.: US 6,273,650 B1
(45) Date of Patent: Aug. 14, 2001

(54) CEMENTED CARBIDE CUTTING INSERT HAVING INTEGRAL STRUCTURE FOR SECURING THE INSERT IN A HOLDER

(75) Inventor: Jonas Jordberg, Norberg (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 09/468,904

(22) Filed: Dec. 22, 1999

(30) Foreign Application Priority Data

Dec. 22, 1998 (SE) .................................................. 9804458

(51) Int. Cl.[7] ............................. B23B 27/14; B23P 15/28
(52) U.S. Cl. ............................. 407/102; 407/119; 407/64
(58) Field of Search .................................. 407/102, 103, 407/104, 107, 64, 113, 120, 97, 119

(56) References Cited

U.S. PATENT DOCUMENTS

| | | | | |
|---|---|---|---|---|
| 41,517 | * | 2/1864 | Low | 408/230 |
| 280,146 | * | 6/1883 | Douglas | 407/64 |
| 1,458,802 | * | 6/1923 | Bufford | 407/90 |
| 1,926,531 | * | 9/1933 | Graham | 407/77 |
| 3,965,553 | * | 6/1976 | Faber | 29/96 |
| 4,197,042 | * | 4/1980 | Krhounek et al. | 408/200 |
| 5,496,137 | | 3/1996 | Ochayon et al. | . |
| 5,733,073 | * | 3/1998 | Zitzlaff et al. | 407/107 |
| 5,795,120 | * | 8/1998 | Hurdle | 411/386 |
| 5,899,642 | | 5/1999 | Berglöw et al. | . |
| 5,947,660 | | 9/1999 | Karlsson et al. | . |
| 5,976,455 | | 11/1999 | Pantzar et al. | . |

* cited by examiner

Primary Examiner—Henry Tsai
(74) Attorney, Agent, or Firm—Burns, Doane, Swecker & Mathis, L.L.P.

(57) ABSTRACT

A cutting insert intended for chip removing machining includes a body forming at least one cutting edge, a securing structure such as a helical thread disposed at one side of the body, and a key grip such as a profiled recess disposed at an opposite side. The insert is formed of injection molded cemented carbide such that the body, the securing structure, and the key grip are all integral with one another. The insert is secured in a holder by rotating the insert using a key which engages the key grip, whereupon the securing structure engages a complementary securing structure on the holder to pull the insert body against the holder.

23 Claims, 9 Drawing Sheets

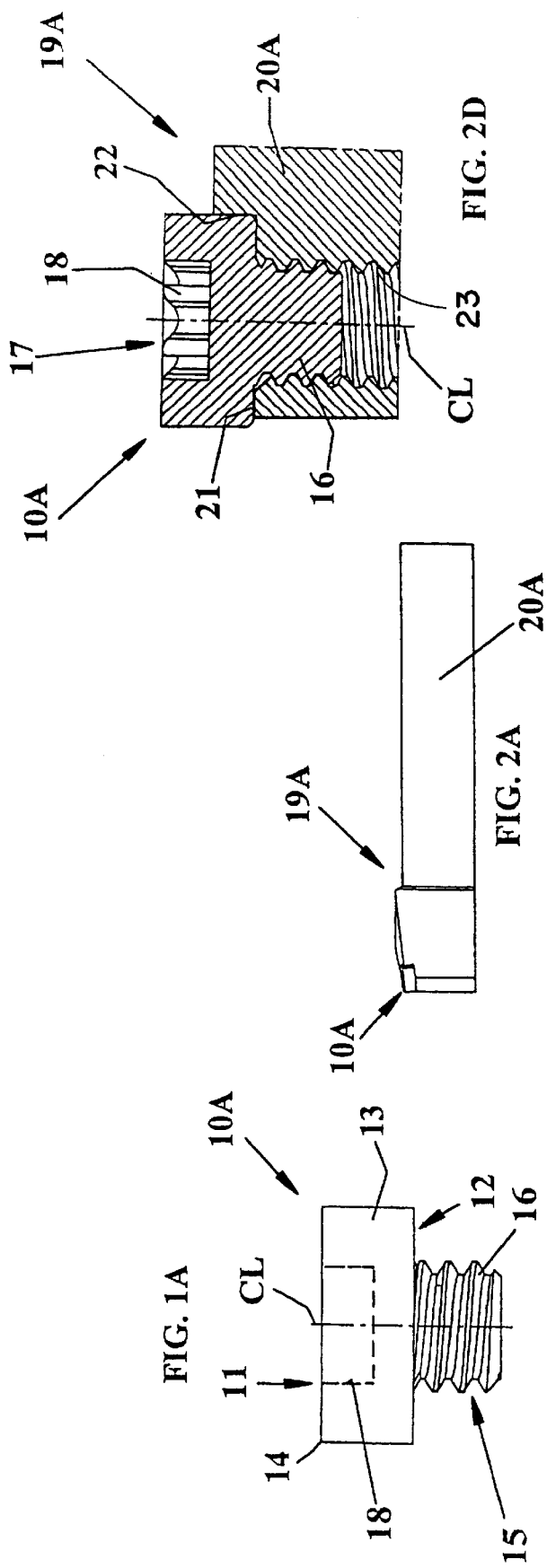

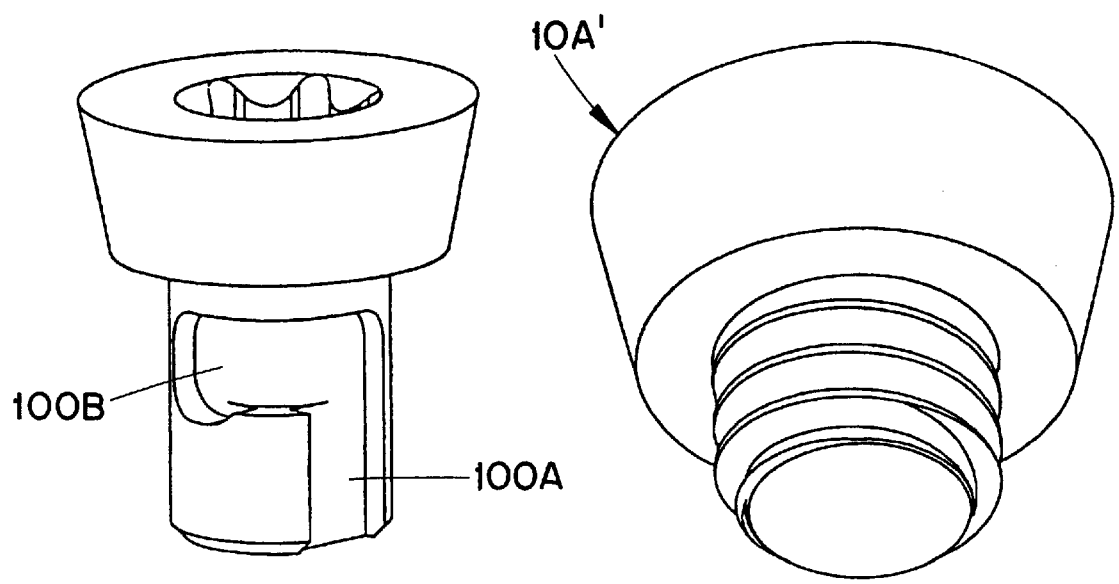
FIG. 2F
FIG. 3B
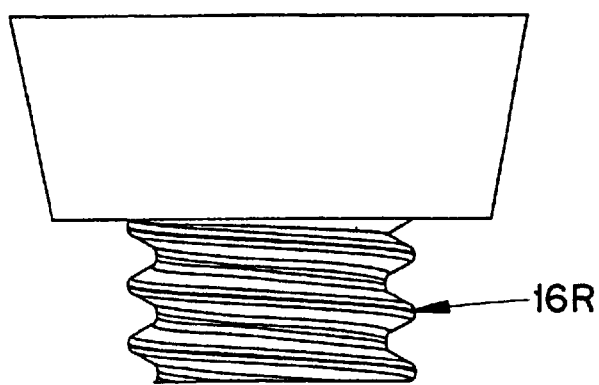
FIG. 2E

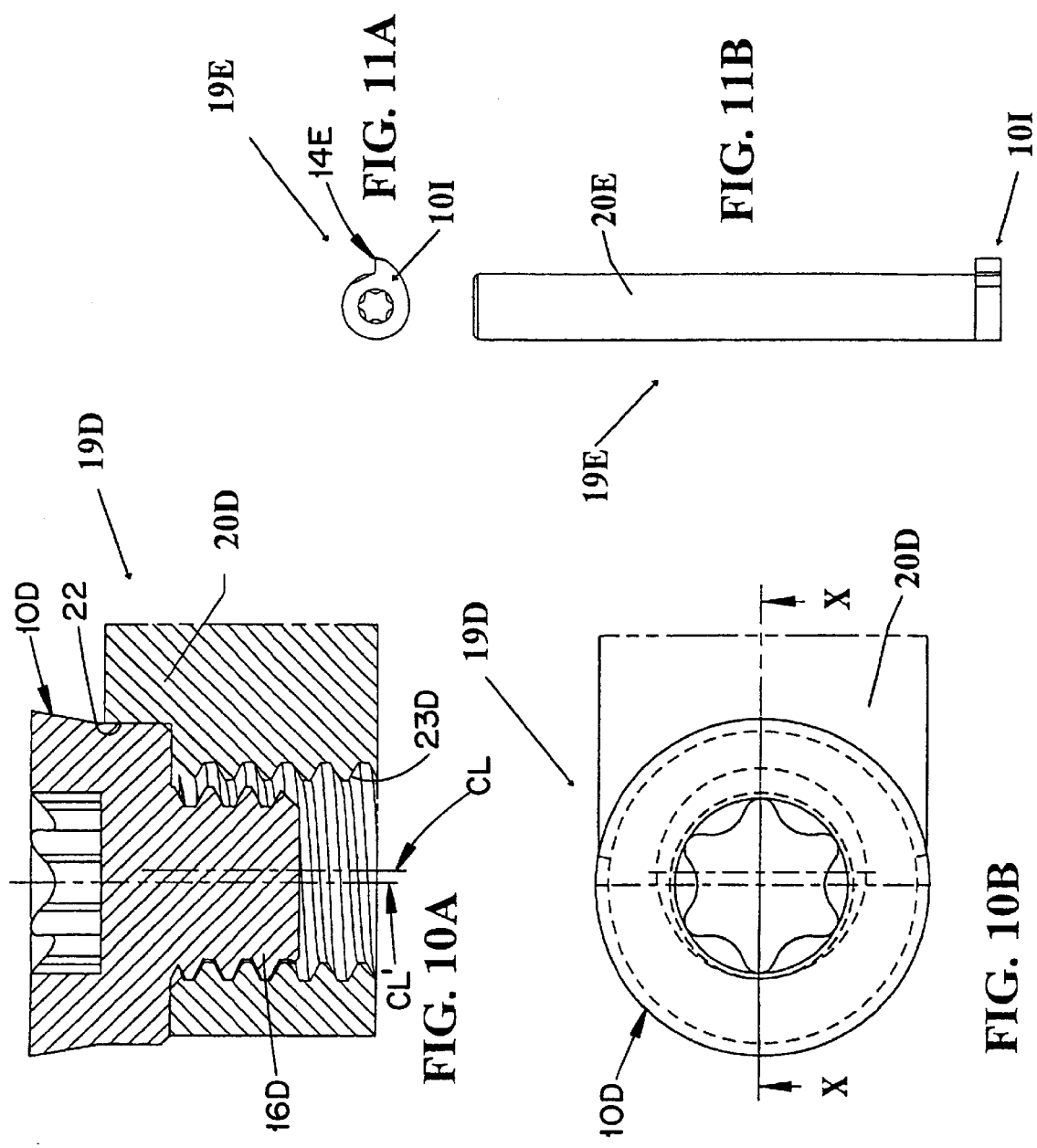

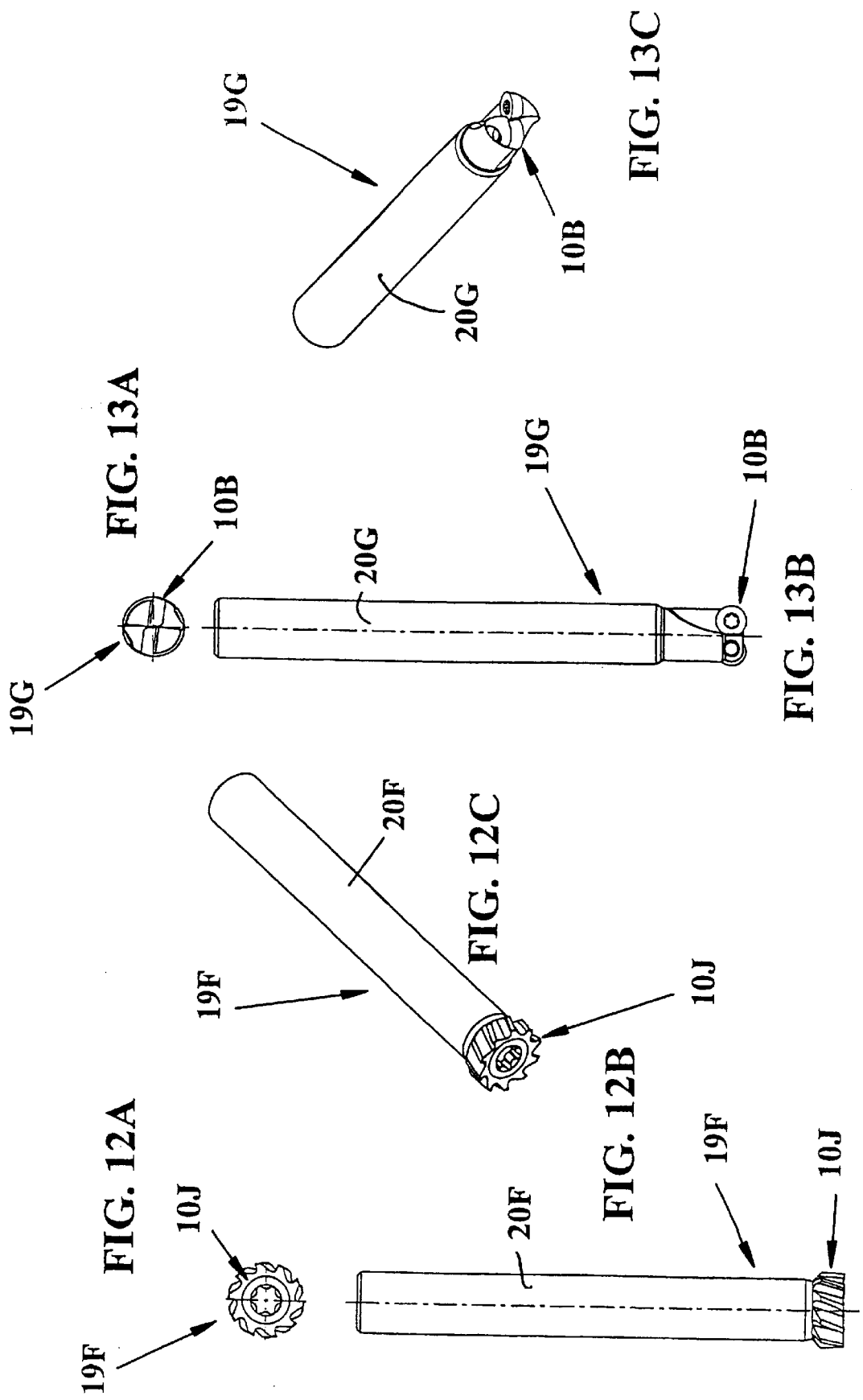

CEMENTED CARBIDE CUTTING INSERT HAVING INTEGRAL STRUCTURE FOR SECURING THE INSERT IN A HOLDER

BACKGROUND OF THE INVENTION

The present invention relates to a tool for cutting machining, a cutting insert and a method for mounting such a cutting insert.

PRIOR ART

Traditionally circular indexable inserts are used having a diameter down to about 5 mm. The smallest circular indexable inserts are to be regarded as rings of cemented carbide in order to obtain space enough to accommodate a retaining screw, which holds the cutting insert in the cutting insert pocket. Through WO 98/13161 is previously known a ball nose milling cutter comprising a milling head attached via a pull rod to a shank. The milling head comprises injection molded cemented carbide and has a cutting edge which extends towards the rotational axis of the tool. The milling head has a thread, which is integral with, and thereby made of the same material as, the cutting edge. The milling head comprises a key grip consisting of diametrical opposite planar surfaces. Through WO 95/33590 is previously known an injection molded cutting insert with an integral thread. Through U.S. Pat. No. 5,496,137 is previously known an end mill with a head having an integral thread and manufactured in accordance with an older technique. The problem of prior art tools of the above-noted types is that if these tools are of small dimensions, then less strength is obtained and the tools are difficult to manipulate.

OBJECTS AND SUMMARY OF THE INVENTION

One object of the present invention is to provide a tool for cutting machining having advantages of the prior art tools.

Another object of the present invention is to provide a tool for cutting machining and a cutting insert with improved strength and which is easy to manipulate.

Still another object of the present invention is to provide a tool for cutting machining and a cutting insert, the designs of which enable the cutting insert to be secured more tightly during operation.

Still another object of the present invention is to provide a method to easily mount such a cutting insert.

These and other objects have been achieved by a tool for cutting machining, a cutting insert and a method for assembling such a tool. The cutting insert comprises a body having at least one cutting edge, securing means disposed on a first side of the body, and a key grip disposed on a second side of the body. The securing means is adapted to secure the body against a holder in response to rotation of the insert about an axis of the securing means. The key grip is configured to be rotated about the axis by a key. The insert comprises injection molded cemented carbide, whereby the body, the securing means, and the key grip are integrally formed with one another.

The method comprises the steps of:
A) providing the above described cutting insert;
B) positioning the cutting insert on a holder such that the securing means engages second securing means disposed on the holder;
C) engaging a key with the key grip; and
D) rotating the cutting insert, using the key, in a direction so that the second securing means pulls the first securing means toward the holder to cause the body to abut the holder.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1A shows a cutting insert according to the present invention in a side view;

FIG. 1B shows the cutting insert in a top view;

FIG. 2A shows a side view of a turning tool according to the present invention;

FIG. 2B shows the turning tool of FIG. 2A in a top view;

FIG. 2C shows the turning tool of FIG. 2A in a perspective view;

FIG. 2D shows a cross-section according to line 11 in FIG. 2B;

FIG. 2E shows an alternative embodiment of a cutting insert according to the present invention in a side view;

FIG. 2F shows an alternative embodiment of a cutting insert according to the present invention in a perspective view;

FIG. 3B shows an alternative embodiment of a cutting insert according to the present invention in a perspective view;

FIG. 10A is a cross-sectional view of an alternative embodiment of a tool according to the present invention;

FIG. 10B is a top view of the tool depicted in FIG. 10A;

FIG. 11A is an end view of an alternative embodiment of a turning tool according to the present invention;

FIG. 11B is a side view of the turning tool depicted in FIG. 11A;

FIG. 11C is a perspective view of the turning tool depicted in FIG. 11A;

FIG. 12A is an end view of an alternative embodiment of a milling tool according to the present invention;

FIG. 12B is a side view of the milling tool depicted in FIG. 12A;

FIG. 12C is a perspective view of the milling tool depicted in FIG. 12A;

FIG. 13A is an end view of an alternative embodiment of a milling tool according to the present invention;

FIG. 13B is a side view of the milling tool depicted in FIG. 13A;

FIG. 13C is a perspective view of the milling tool depicted in FIG. 13C;

DETAILED DESCRIPTION OF PREFERRED EMBODIMENTS OF THE INVENTION

Figure 3A:
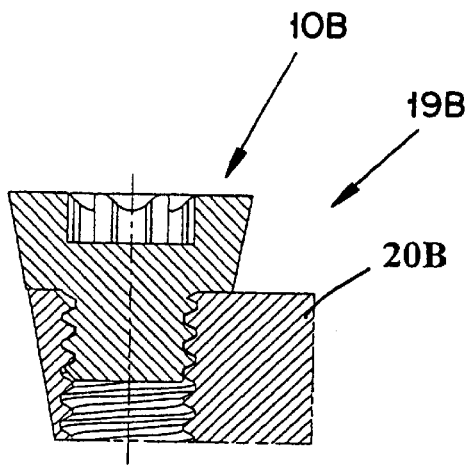
FIG. 3A shows an alternative embodiment of a tool according to the present invention in a cross-section.

In FIGS. 1A and 1B is shown a cutting insert 10A according to the present invention, which insert preferably is intended for longitudinal turning.

The cutting insert 10A has a round geometry of so called R type. The cutting insert has an upper side 11 and a substantially planar, opposite lower side 12, the sides 11, 12 being interconnected by a cylindrical edge surface 13. The cutting insert has a circular cutting edge 14 formed along a line of intersection between the upper side 11 and the edge surface 13. The cutting insert 10A has a center line CL. The cutting insert comprises securing means 15 to be used for securing the cutting insert against a holder. The diameter of the cutting insert is considerably larger than the diameter of the securing means 15. The securing means 15 is integrated with the cutting insert and thereby formed of the same material as the cutting edge 14. This has been obtained through injection molding with suitable equipment and subsequent sintering. The cutting insert is made by mixing powder of sintered hard alloy with an organic binder, such as plastic, and shaping the mixture into pellets or granules. Said pellets or granules are cast by means of an injection molding process, whereafter the obtained product is sintered at a temperature of 1300 to 1500° C. The injection molding technique has been more closely described in EP 96913765.2, the contents of which are hereby is incorporated in the present description. The securing means 15 projects perpendicularly from the center part of the lower side 12. The securing means 15 comprises an externally threaded spigot 16 the center axis of which substantially coincides with the centerline CL of the cutting insert. In the shown embodiment the thread has one entrance and one exit. Alternatively the thread may be a multiple thread type having at least two entrances and at least two exits of the type provided on the insert 10A' shown in FIG. 3B. In other words, the securing means 15 comprises one or more external, helically shaped grooves.

The upper side 11 of the cutting insert 10A, i.e., the side of the insert 11 opposite said securing means 15, comprises at least one key grip 17. The key grip 17 has the shape of a profiled recess 18 intended to cooperate with a key during clamping of the cutting insert against the holder. The key grip 17 has a center axis, which substantially coincides with the centerline CL of the cutting insert. The profile of the key grip is of the type Torx® or an Allen key, or similar, that is a profile which comprises more than two surfaces for driving, preferably six such surfaces. Consequently, the centerline of the securing means 15 substantially coincides with the centerline of the key grip 17. The grip 17 is arranged within an imaginary cylinder 24, the diameter of which substantially corresponds to the average diameter of the thread 16. Likewise, it can be noted that the cutting edge 14 preferably occupies one plane. The cutting edge 14 surrounds the key grip 17 by being provided radially outside of, and at a distance from, the key grip relative to the centerline CL.

FIGS. 2A–2D show a turning tool 19A according to the present invention comprising a holder 20A and the cutting insert 10A. The holder 20A comprises a shank having one end provided with a cutting insert pocket while the other end provided to be fastened in a machine for turning. The holder is made of steel. The cutting insert pocket comprises a bottom surface 21 and a side support surface 22, FIG. 2D. The holder 20A comprises means for clamping the cutting insert in the cutting insert pocket, the means being in the form of a threaded hole 23, which extends substantially perpendicularly to the plane of the bottom surface 21. The thread in the hole 23 has one entrance and one exit in the shown embodiment. Alternatively the thread may have at least two entrances and at least two exits. In other words, the means 23 comprises one or more internal, helically shaped grooves.

The hole 23 is provided centrally in the substantially round bottom surface. The side support surface 22 is part-cylindrically concave in order to fit the convex edge surface 13 of the cutting insert.

Mounting of the cutting insert 10A in the holder 20A is done as follows. The cutting insert is brought in a direction towards the bottom surface 21 of the cutting insert pocket such that the centerline of the securing means or spigot 15 is aligned with the centerline of the hole 23. The cutting insert is pushed towards the cutting insert pocket such that the threads abut against each other. Subsequently, the cutting insert 10A and the associated threaded spigot 15 are rotated as a one-piece unit by hand or with the aid of a suitable key, not shown, in engagement with the key grip 17, until the lower side 12 of the cutting insert abuts the bottom surface 21 of the cutting insert pocket. Then the key should be used to firmly tighten the cutting insert against the bottom surface in order to create a pre-tension in the more elastic steel threads of the hole 23. In the preferred embodiment the cutting insert 10A has a diameter about 4 mm, a metric thread M2.2 and a key grip T07. More generally, the diameter of the cutting insert lies in the range of 3–5 mm. The thread may be of any type and optionally may be right-hand or left-hand. A type of thread which is well adapted to being made of sintered cemented carbide is a rope thread, see FIG. 2E. The thread in FIG. 2E is a left-hand rope thread, which in connection with the round cutting edge 14 tends to tighten the threaded connection during machining with the insert.

Alternatively, as shown in FIG. 2F, the thread of the spigot 15 can be replaced by one or more right-angel shaped grooves having an axial portion 100A and a circumferential portion 100B. The circumferential dimension of which is smaller than 360°. The groove or grooves shall then fit with a corresponding radial protrusion(s) in the hole of the holder in order to create a bayonet type of coupling. It will then be possible to index the cutting insert into as many positions as there are grooves, in order to position a fresh cutting edge for cutting. The circumferential portion could be somewhat helical to cause the insert to be pulled against the holder as the insert is rotated.

Indexing of the cutting insert of FIG. 1A may alternatively be achieved by providing a shim between the bottom surface of the holder and the lower side of the cutting insert to restrict the extent to which the insert can be rotated. The thickness of the shim could, for example, be chosen to equal one-half of the pitch of the thread in order to achieve indexing by 180°.

In FIG. 3A is shown an alternative embodiment of a tool 19B according to the present invention. The difference between this embodiment and the above-described tool is partly that the cutting insert 10B has a positive basic geometry and partly that the side support surface of the holder is omitted.

Thereby all cutting forces are received by the bottom surface and the thread in the holder 20B.

Figure 4A:
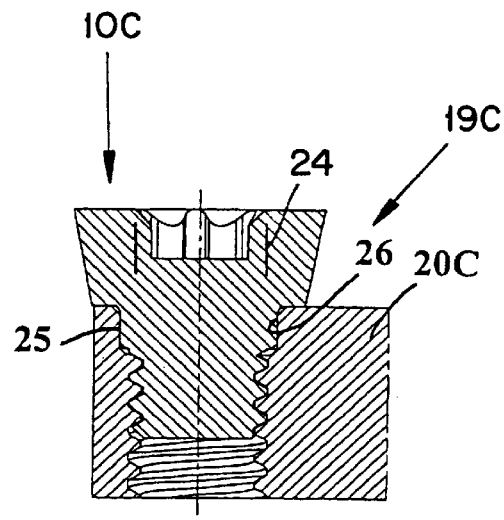
FIG. 4A shows an alternative embodiment of a cutting insert and a tool according to the present invention in a cross-section.

In FIG. 4A is shown an alternative embodiment of a cutting insert 10C and a tool 19C according to the present invention. The difference between this embodiment and the above-described tool according to FIG. 3A is that both the spigot and the hole of the holder comprise cylindrical guiding surfaces 25 and 26, respectively, provided radially beyond the imaginary cylinder 24. The diameters of the guiding surfaces 25, 26 are adapted for a mutual sliding fit. In this case all cutting forces are received by the bottom surface, the guiding surfaces 25, 26 and the thread in the holder.

Figure 4B:
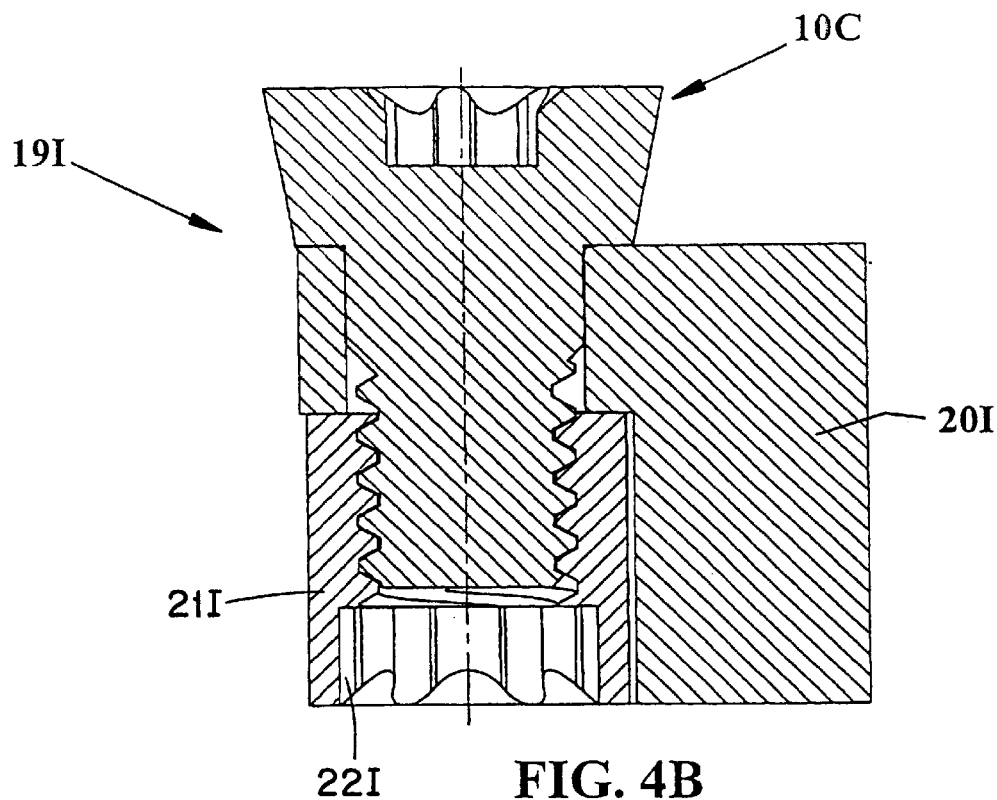
FIG. 4B shows an alternative embodiment of a cutting insert and a tool according to the present invention in a cross-section.
Figure 4C:
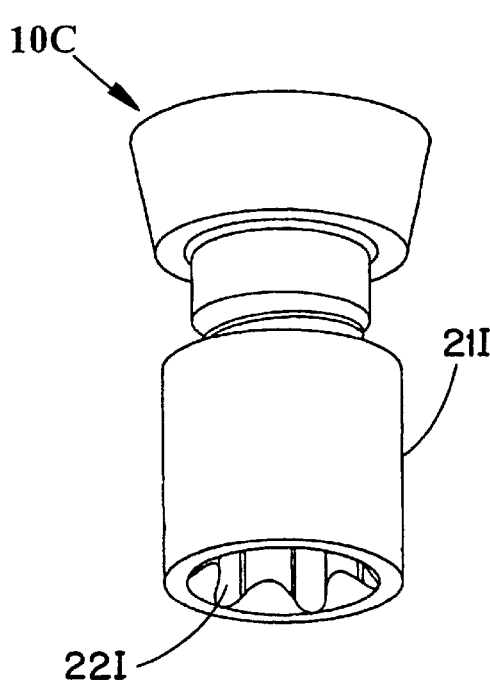
FIG. 4C is a perspective view of the cutting insert and nut depicted in FIG. 4B.
Figure 4D:
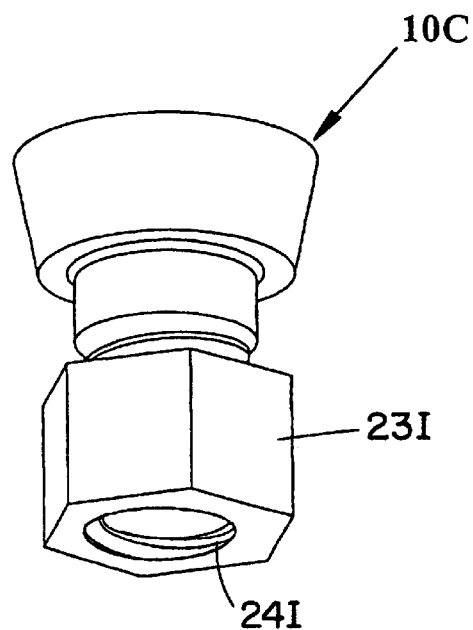
FIG. 4D is a perspective view of the cutting insert of FIG. 4B in combination with a nut having an external Allen grip.

In FIG. 4B is shown an alternative embodiment of a cutting insert 10C and a tool 19I according to the present invention. The difference between this embodiment and the above-described tool according to FIG. 4A is that the thread in the holder now has been replaced by a thread in a loose nut 211 having a Torx® grip 221. The nut and the cutting insert 10C are rotated relative to each other in order to mount or dismount the cutting insert. FIG. 4C shows the nut and the cutting insert 10C of FIG. 4A separate from the holder. FIG. 4D shows an alternative nut 231 with external Allen grip 241 and the cutting insert 10C from FIG. 4A.

Figure 5A:
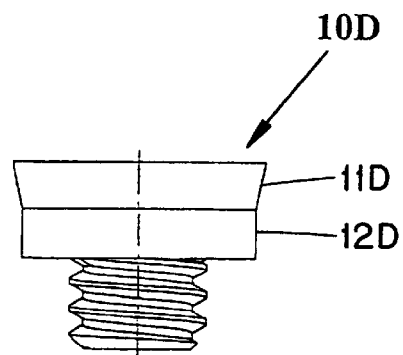
FIG. 5A is a side view of an alternative embodiment of a cutting insert according to the present invention.
Figure 5B:
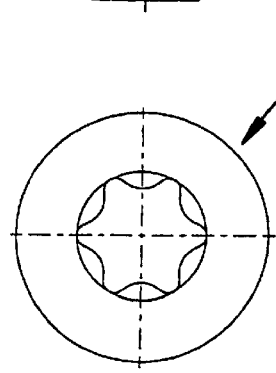
FIG. 5B is a top view of the cutting insert of FIG. 5A.

In FIGS. 5A and 5B is shown an alternative embodiment of a cutting insert 10D according to the present invention. The difference between this embodiment and the above-described tool according to FIG. 3A is that the edge surface or the clearance surface of the cutting insert is generally concave and comprises a frusto conical portion 11D and a cylindrical portion 12D which intersect one another. If the insert should break, the line of fracture will be guided toward that line of intersection.

Figure 6:
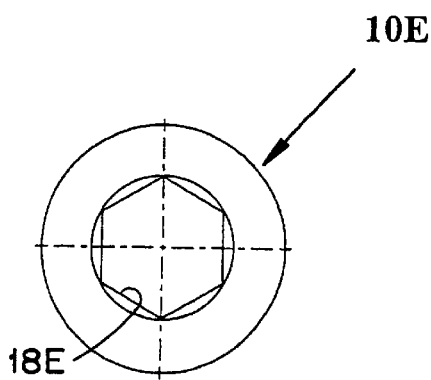
FIG. 6 shows an alternative embodiment of a cutting insert according to the present invention in a top view.

In FIG. 6 is shown an alternative embodiment of a cutting insert 10E according to the present invention in a top view. The difference between this embodiment and the above-described tools is that the key grip 18E comprises a hexagonal recess, i.e., a so-called Allen grip.

Figure 7A:
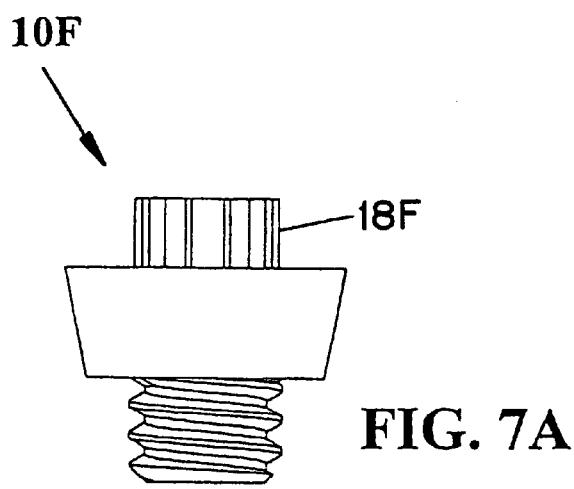
FIG. 7A is a side view of an alternative embodiment of a cutting insert according to the present application.
Figure 7B:
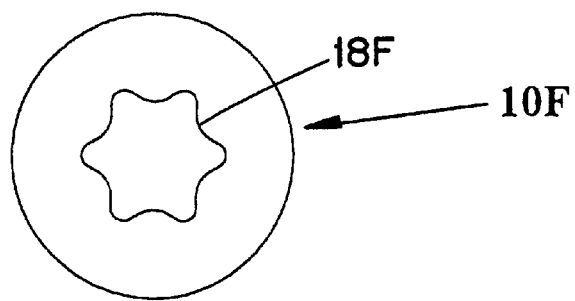
FIG. 7B is a top view of the insert depicted in FIG. 7A.

In FIGS. 7A and 7B is shown an alternative embodiment of a cutting insert 10F according to the present invention. The difference between this embodiment and the above-described tool according to FIG. 3A is that the key grip includes a profiled projection 18F on the cutting insert. The projection comprises a male portion for a so-called Torx® connection. The projection shall cooperate with a female portion of similar but inverted geometry. The projection also serves as a chip former or chip breaker. Alternatively, the projection may consist of a male portion of an Allen key connection, that is a projection with a hexagonal cross-section. The use of such a projection may however be considered as an inferior technical solution as compared to the earlier described use of a recess (e.g. recess 18) for tools of small diameters and small chip spaces.

Figure 8A:
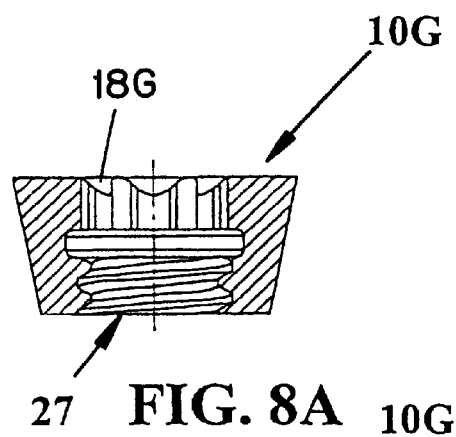
FIG. 8A is a cross-sectional view of another alternative embodiment of a cutting insert according to the present invention.
Figure 8B:
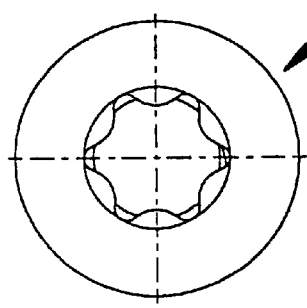
FIG. 8B is a top view of the cutting insert depicted in FIG. 8A.

In FIGS. 8A and 8B is shown an alternative embodiment of a cutting insert 10G according to the present invention. The difference between this embodiment and the above-described tool according to FIG. 3A is that the helically formed grooves now are on a female portion, i.e. they are formed in a center recess 27 in the cutting insert. The recess 27 transforms into the key grip recess 18G at the mid portion of the cutting insert. The thread of the recess 27 shall cooperate with a screw (not shown) in the holder, whereby the thread constitutes a securing means for the insert. The screw could be either firmly anchored in the holder or rotatable in the holder. The recess may include one or more internal, helically shaped grooves.

Figure 9:
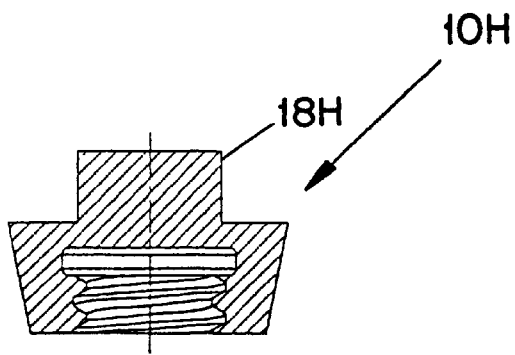
FIG. 9 shows an alternative embodiment of a cutting insert according to the present invention in a cross-section.

In FIG. 9 is shown an alternative embodiment of a cutting insert 10H according to the present invention. The difference between this embodiment and the above-described tool according to FIGS. 8A and 8B is that the key grip 18H is a projection.

In FIGS. 10A and 10B is shown an alternative embodiment of a tool 19D according to the present invention with a cutting insert 10D previously described in connection with FIGS. 5A and 5B. The difference between this embodiment and the above-described tool according to FIG. 2D is mainly that the threaded hole of the holder is made larger than the thread of the spigot 16D and is displaced by a distance towards the side support surface 22 such that the center line CL of the hole is offset in said direction with respect to the center line CL' of the cutting insert. The hole's smallest diameter is larger than the largest diameter of the spigot, so the spigot can be inserted deeply without rotation into in the hole of the holder, whereafter rotation of the cutting insert can start. Then, only the parts of the threads which face away from the side support surface will be in engagement with the hole thread during tightening, simultaneously as the edge surface of the cutting insert bears against the side support surface 22. In this manner a quick attachment function is obtained. Said feature can also be obtained by means of mutually substantially identical conical threads whose center lines coincide.

In FIGS. 11A–11C is shown an alternative embodiment of a tool 19E and a grooving-type cutting insert 101 according to the present invention. The tool 19E is intended for inside grooving and comprises a cylindrical holder 20E and the grooving insert 101 which has a projecting cutting portion 14E. The cutting insert is mounted in a selected one of the above-described manners and optionally the geometries of the threads may be arranged such that the final position for the cutting edge of the cutting portion is predetermined.

In FIGS. 12A–12C is shown an alternative embodiment of a tool 19F and a cutting insert 10J according to the present invention. The tool 19F is intended for example for end milling and comprises a cylindrical cutting insert 10J, which does divide each chip. The cutting insert is mounted in a selected one of the above-described manners, and since the cutting insert comprises a number of symmetrically placed cutting portions and is to be rotated, there is no need for indexing. Alternatively, the cutting insert is developed as a chip-dividing, cylindrical end-milling insert, or a thread milling insert, or a broaching insert, or a truncated conical head for end-milling of dove tail slots (wherein the latter has a cone apex directed towards the holder), or a similar insert. Common for all of these tools is that they replace conventional end mills in high-speed steel where smaller dimensions (5 to 15 mm in diameter) often are desirable.

In FIGS. 13A–13C is shown an alternative embodiment of a tool 19G and cutting insert 10B, shown in FIG. 3A, according to the present invention. The tool 19G is intended for example for grooving and it comprises two of the earlier described cutting inserts 10B, whereof one of the cutting inserts overlaps the rotational axis of the tool such that the milling cutter also can drill.

Figure 14A:
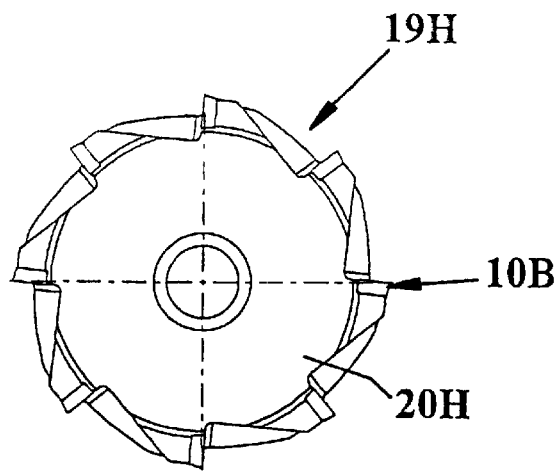
FIG. 14A is an end view of yet another embodiment of a milling tool according to the present invention.
Figure 14B:
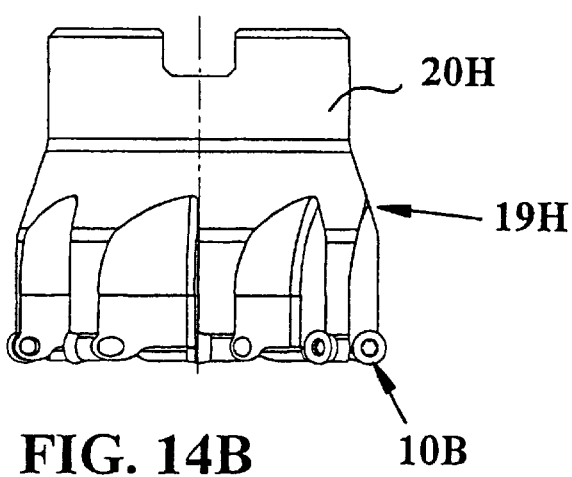
FIG. 14B is a side view of the milling tool depicted in FIG. 14A.
Figure 14C:
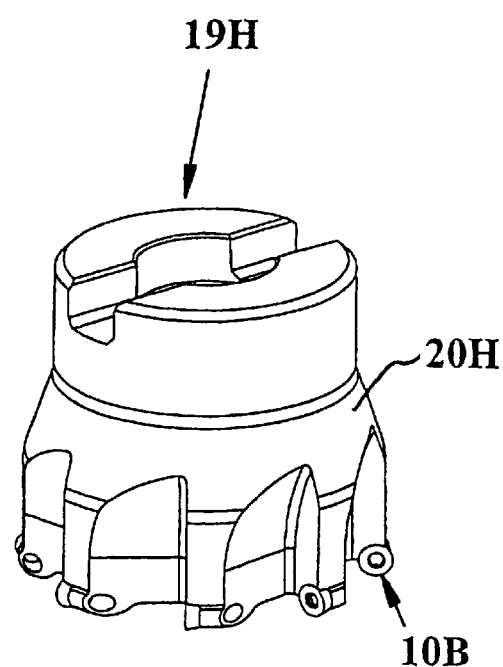
FIG. 14C is a perspective view of the milling tool depicted in FIG. 14A.

In FIGS. 14A–14C is shown an alternative embodiment of a tool 19H and cutting insert 10B, previously described in connection with FIG. 3A, according to the present invention. The tool 19H is intended for example for face milling and it comprises eight cutting inserts 10B.

Figure 15A:
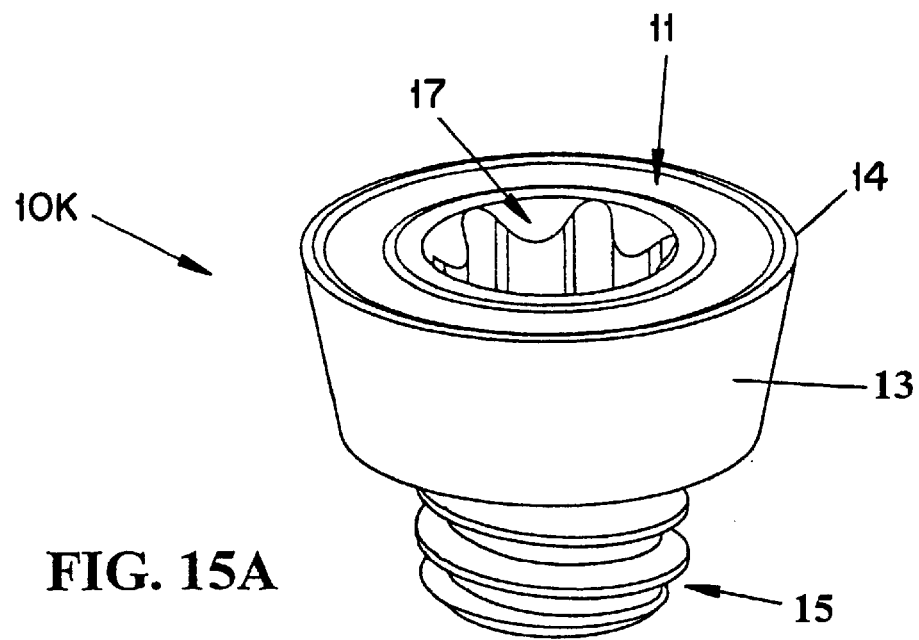
FIG. 15A shows an alternative embodiment of a cutting insert according to the present invention in a perspective view.
Figures 15B, 15C, 15D:
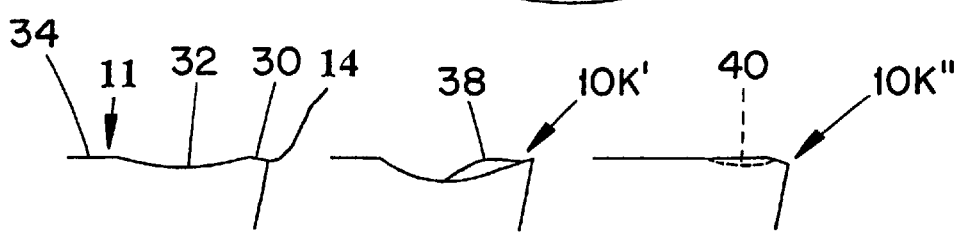
FIG. 15B shows the cutting insert in FIG. 15 in a cross-section.

In FIGS. 15A and 15B is shown an alternative embodiment of a cutting insert 10K according to the present invention. The difference between this embodiment and the above-described tool according to FIG. 3A is that the upper side 11 of the cutting insert comprises a chip breaker. A reinforcing chamfer 30 is connected to the cuffing edge 14. The chamfer further connects to a concave chip surface 32 which in turn connects to a rear surface 34. FIG. 15 C shows a cross-section of a modified insert 10K' similar to FIG. 15B but without a reinforcing chamfer. In FIG. 15C a projection 38 is depicted. A number of separate projections 38 is provided with even spacing along the chip surface periphery. FIG. 15D shows a cross-section of a modified insert 10K" similar to FIG. 15B but without a concave chip surface. A planar chip surface connects to the reinforcing chamfer. In FIG. 15D a recess 40 is depicted by a dotted line. A number of separate recesses is provided with even spacing along the chip surface periphery.

Figure 16:
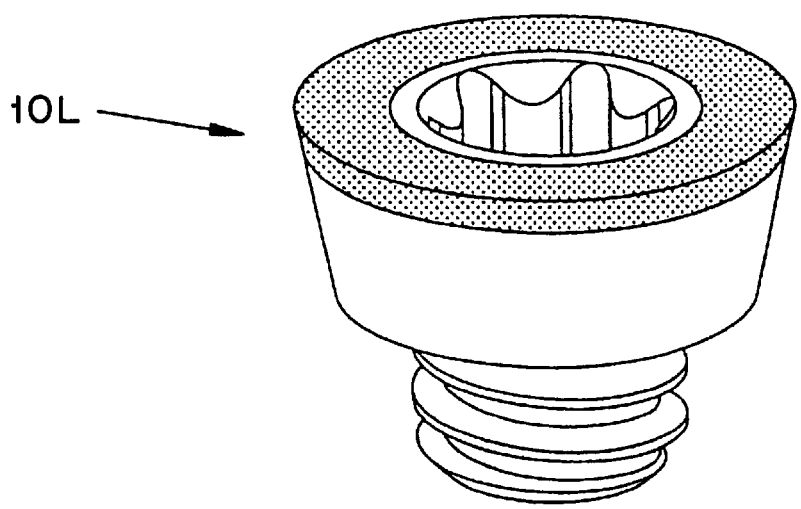
FIG. 16 shows an alternative embodiment of a cutting insert according to the present invention in a perspective view.

In FIG. 16 is shown an alternative embodiment of a cutting insert 100L according to the present invention. The difference between this embodiment and the above-described tool according to FIG. 3A is that the upper side 11 of the cutting insert comprises a ring of material which is more wear resistant than cemented carbide, such as cubic boron nitride or diamond. The ring surrounds the key grip.

The present invention consequently relates to a tool for cutting machining, a cutting insert with improved strength and ease of handling and a method to easily mount such a cutting insert. More specifically, by the cutting insert in itself been designed as a screw or nut, the hard to handle screws used today in connection with tools according to known technique with little diameters are avoided. A solution according to the mentioned WO 98/13161 is not suitable for turning tools where there is a side support surface on the holder, since the side support surface would obstruct the movement of one arm of the key during attempted rotation thereof. Consequently the shown embodiments may be combined into tools and cutting inserts not specifically illustrated in the present patent application.

Although the present invention has been described in connection with preferred embodiments thereof, it will be appreciated by those skilled in the art that additions, modifications, substitutions and deletions not specifically described may be made without departing from the spirit and scope of the invention as defined by the appended claims.

What is claimed is:

1. A cutting insert for chip removing machining comprising a body having an outer peripheral edge defining at least one cutting edge, securing means disposed on a first side of the body and adapted to secure the body against a holder in response to rotation of the insert about an axis of the securing means, and a key grip disposed on a second side of the body situated axially opposite the first side; the key grip configured to be rotated about the axis by a key; the body, the securing means, and the key grip being integrally formed with one another of injection molded cemented carbide, wherein the key grip comprises a profiled surface spaced radially inwardly of, and surrounded by, the outer peripheral edge.

2. The cutting insert according to claim 1 wherein the first side is adapted to bear against a support surface of a holder, the securing means disposed at a center of the first side.

3. The cutting insert according to claim 1 wherein the key grip comprises a profiled recess having a centerline substantially coinciding with the axis.

4. The cutting insert according to claim 3 wherein the profiled recess includes more than two drive surfaces engageable by the key for rotating the insert.

5. The cutting insert according to claim 1 wherein the key grip comprises a profiled projection having a centerline substantially coinciding with the axis.

6. The cutting insert according to claim 5 wherein the profiled projection includes more than two drive surfaces engageable by the key for rotating the insert.

7. The cutting insert according to claim 1 wherein the securing means comprises a helical thread arranged coaxially with the axis and adapted to mate with a helical thread on a holder.

8. The cutting insert according to claim 7 wherein the thread of the securing means is disposed on an outer surface of a spigot.

9. The cutting insert according to claim 7 wherein the thread of the securing means is formed on a surface of a recess formed in the second side.

10. The cutting insert according to claim 7 wherein the helical thread has at least two entrances.

11. The cutting insert according to claim 1 wherein the key grip includes an axis substantially coinciding with the axis of the securing means.

12. The cutting insert according to claim 2 wherein the body includes an edge surface intersecting the second side to form the cutting edge therewith, the cutting edge being circular and arranged coaxially with respect to the axis.

13. The cutting insert according to claim 1 wherein the securing means comprises a right-angle groove adapted to cooperate with a radial projection of a holder to form a bayonet connection.

14. A tool for chip removing machining comprising a holder and at least one cutting insert mounted on the holder; the insert comprising a body having an outer peripheral edge defining at least one cutting edge, securing means disposed on a first side of the body and adapted to secure the body against a holder in response to rotation of the insert about an axis of the securing means, and a key grip disposed on a second side of the body situated axially opposite the first side; the key grip configured to be rotated about the axis by a key; the body, the securing means, and the key grip are integrally formed with one another of injection molded cemented carbide, wherein the key grip comprises a profiled surface spaced radially inwardly of, and surrounded by, the outer peripheral edge.

15. The tool according to claim 14 wherein the key grip comprises a profiled recess having a centerline substantially coinciding with the axis.

16. The tool according to claim 14 wherein the key grip comprises a profiled projection having a centerline substantially coinciding with the axis.

17. The tool according to claim 14 wherein the securing means comprises a first helical thread arranged coaxially with the axis and connectible to a second helical thread disposed on the holder.

18. The tool according to claim 17 wherein the first helical thread is disposed on an outer surface of a spigot.

19. The tool according to claim 17 wherein the first helical thread is formed on a surface of a recess formed in the second side.

20. A method of assembling a chip removing machining tool comprising the steps of:

A) providing a cutting insert having a body with an outer peripheral edge defining at least one cutting edge, first securing means disposed on one side of the body, and a key grip disposed on a second side of the body situated opposite the first side, wherein the key grip comprises a profiled surface spaced radially inwardly of and surrounded by the outer peripheral edge, the cutting insert formed of injection molded cemented carbide whereby the body, the securing means, and the key grip are integrally formed with one another;

B) positioning the cutting insert on a holder such that the securing means engages second securing means disposed on the holder;

C) engaging a key with the key grip; and

D) rotating the cutting insert, using the key, in a direction so that the second securing means pulls the first securing means toward the holder to cause the body to abut the holder.

21. The method according to claim 20 wherein step D comprises causing the second securing means in the form of a helical thread to pull the first securing means in the form of a helical thread toward the holder.

22. The method according to claim 20 further including the step of arranging the insert so that cutting forces occurring during a cutting operation cause the insert to be further rotated in said direction for causing the body to firmly abut the holder.

23. The cutting insert according to claim 1 wherein the profiled surface is arranged symmetrically relative to the axis.

* * * * *